Figure 1:
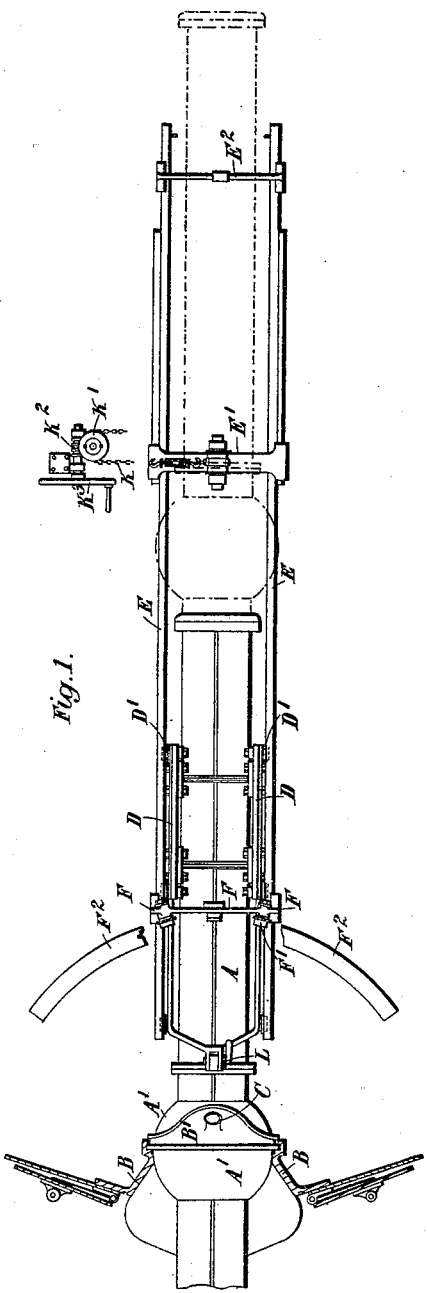

(No Model.)  5 Sheets—Sheet 1.

J. B. G. A. CANET.
TORPEDO TUBE MOUNTING.

No. 470,288. Patented Mar. 8, 1892.

(No Model.) 5 Sheets—Sheet 2.

J. B. G. A. CANET.
TORPEDO TUBE MOUNTING.

No. 470,288. Patented Mar. 8, 1892.

Witnesses:
J. A. Rutherford.
S. H. Daly.

Inventor:
Jean B. G. A. Canet.
By James L. Norris.
Attorney.

(No Model.) 5 Sheets—Sheet 3.
J. B. G. A. CANET.
TORPEDO TUBE MOUNTING.
No. 470,288. Patented Mar. 8, 1892.
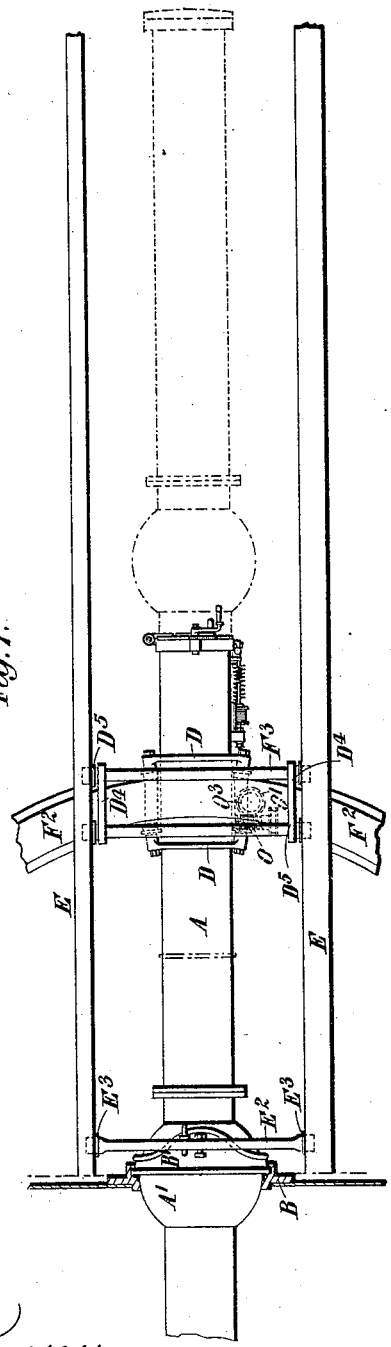
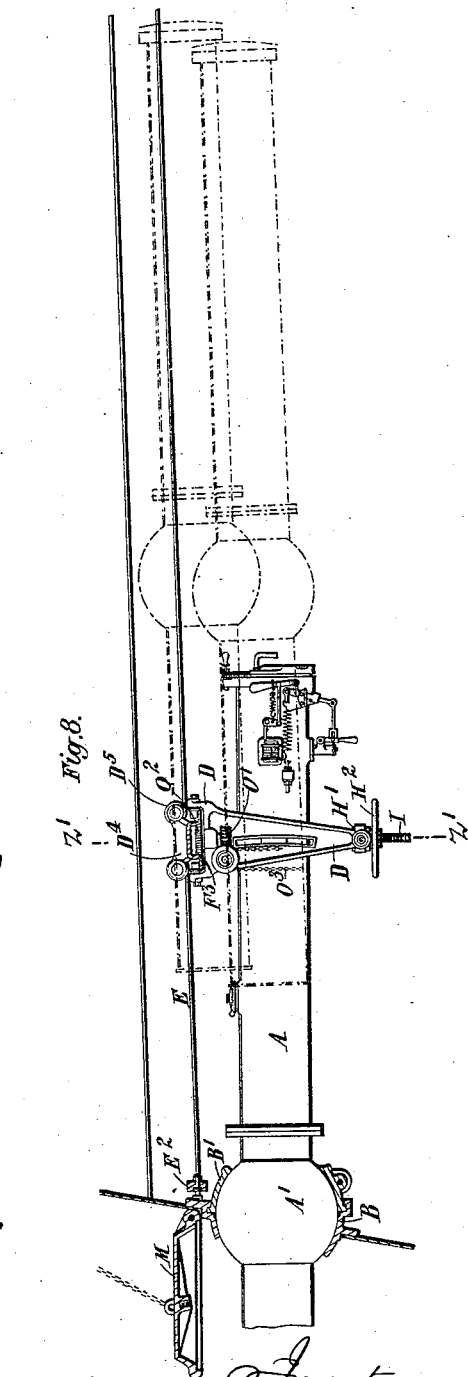

(No Model.) 5 Sheets—Sheet 4.
J. B. G. A. CANET.
TORPEDO TUBE MOUNTING.
No. 470,288. Patented Mar. 8, 1892.

(No Model.) 5 Sheets—Sheet 5.
J. B. G. A. CANET.
TORPEDO TUBE MOUNTING.
No. 470,288. Patented Mar. 8, 1892.
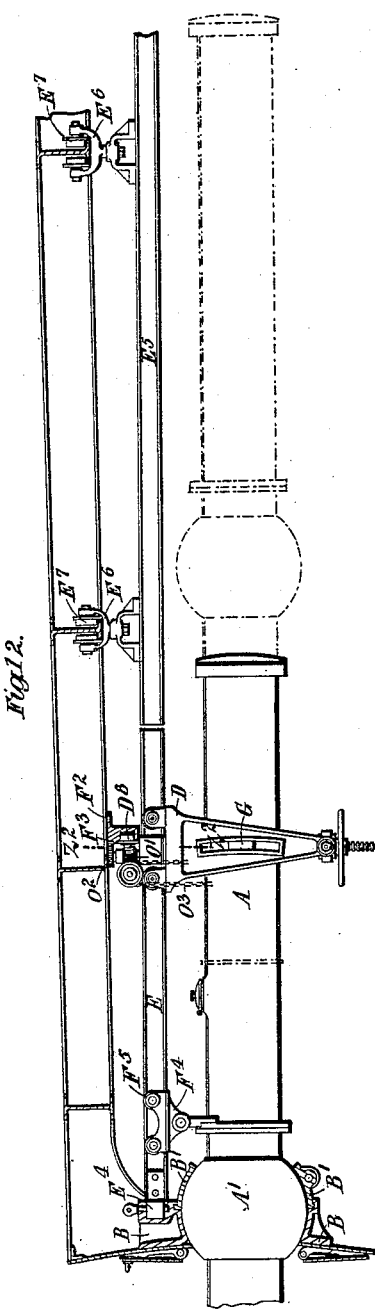
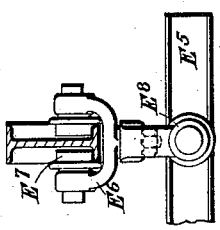
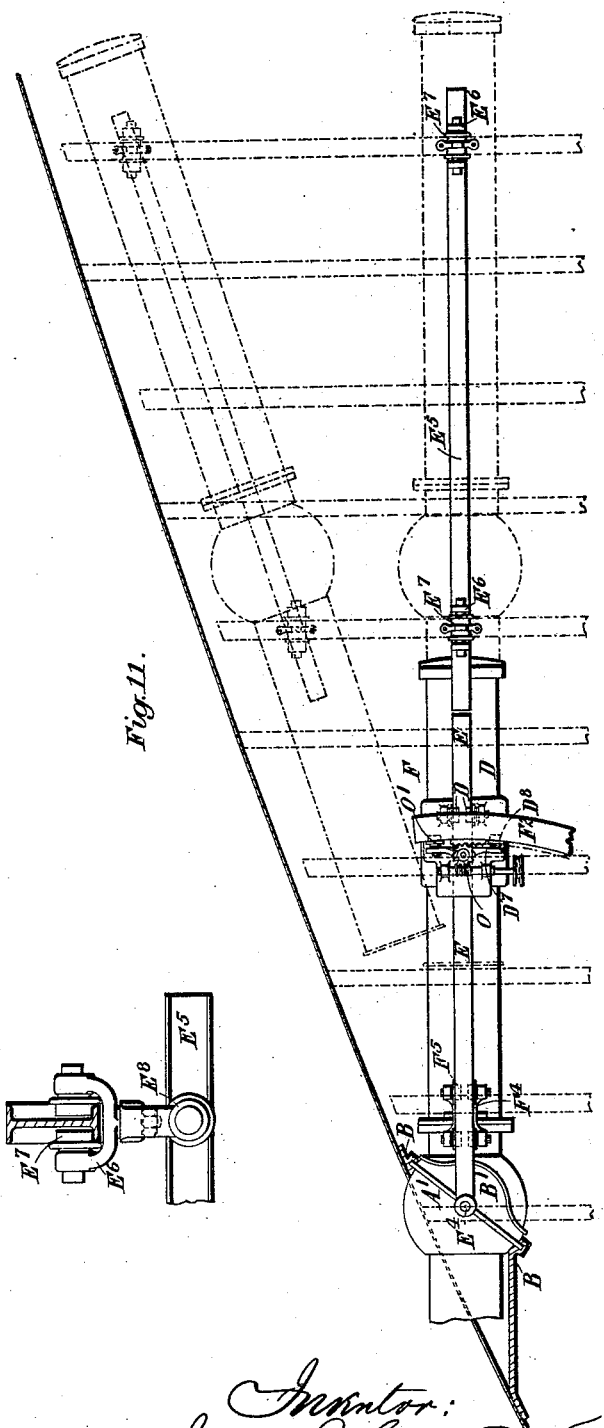

UNITED STATES PATENT OFFICE.

JEAN BAPTISTE GUSTAVE ADOLPHE CANET, OF PARIS, FRANCE, ASSIGNOR OF ONE-HALF TO THE SIR JOSEPH WHITWORTH & COMPANY, LIMITED, OF OPENSHAW, ENGLAND.

TORPEDO-TUBE MOUNTING.

SPECIFICATION forming part of Letters Patent No. 470,288, dated March 8, 1892.

Application filed June 9, 1891. Serial No. 395,657. (No model.) Patented in France October 8, 1883, No. 157,914.

*To all whom it may concern:*

Be it known that I, JEAN BAPTISTE GUSTAVE ADOLPHE CANET, engineer, a citizen of the Republic of France, and a resident of Paris, France, have invented certain new and useful Improvements in Torpedo-Tube Mountings, (for which I have obtained Letters Patent in the following country, viz: France, certificate of addition to No. 157,914, dated May 3, 1886, original patent dated October 8, 1883, which invention was formerly included in my application for Letters Patent of the United States, No. 304,204, filed March 21, 1889,) of which invention the following is a specification, reference being had to the accompanying drawings.

My invention is designed to provide for the mounting of torpedo-tubes between decks on board a ship or vessel, either in the stern, amidships, or in the forward part of the ship, or on a floating or other battery.

An important feature of my said invention is the provision which I make for the connection of the torpedo-tube with the side or wall of a ship or battery by a universal joint, which is so constructed that the said torpedo-tube can be run out and in and can be readily connected with and disconnected from the side or wall of the ship or battery, and when connected therewith can be aimed or pointed at an object. By these means I obviate the necessity for leaving the torpedo-tube exposed to an enemy's fire, except for a sufficient length of time to permit the aiming or pointing of the said tube and the launching of a torpedo therefrom.

My said invention, moreover, comprises improved means for running the torpedo-tube out and in and improved means for aiming or pointing the said torpedo-tube.

My said invention also comprises devices for closing the port-hole in the side or wall of the ship or battery when the torpedo-tube is withdrawn therefrom, and improved means for facilitating the housing of the torpedo-tube when the same is not in use.

Figure 2:
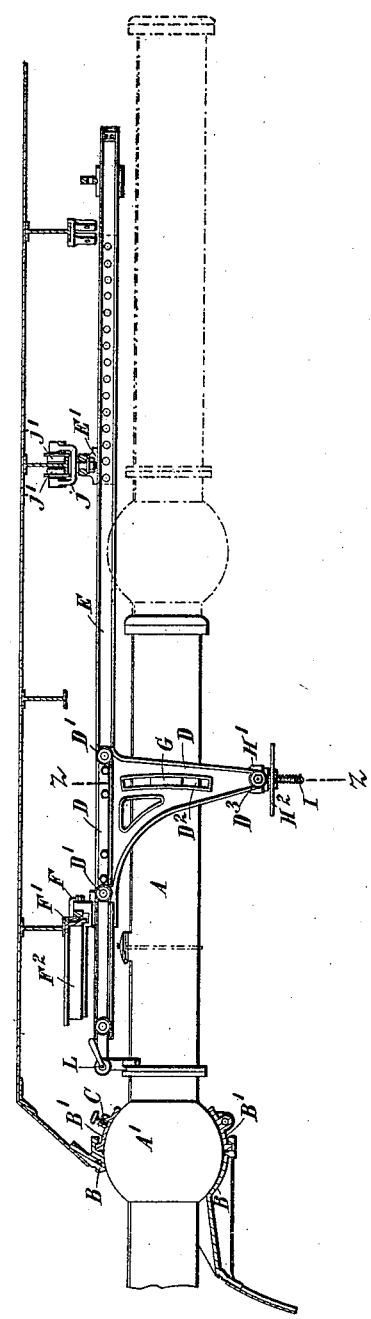
Figure 3:
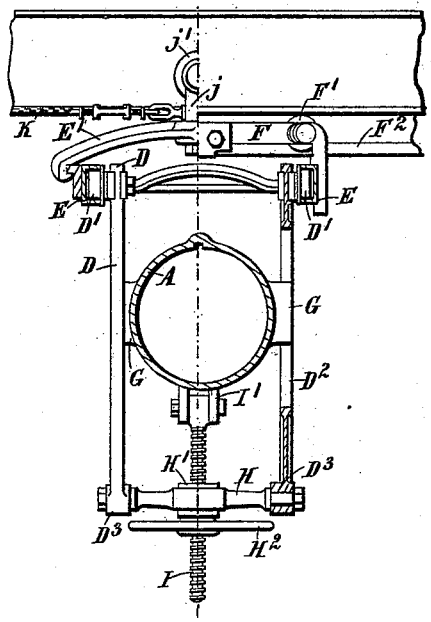
Figure 4:
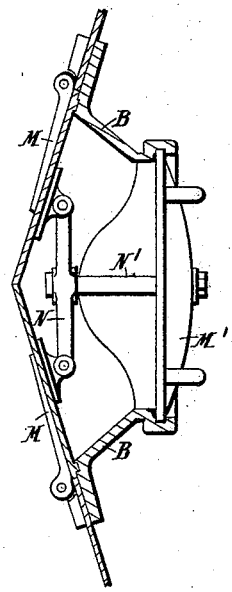
Figure 5:
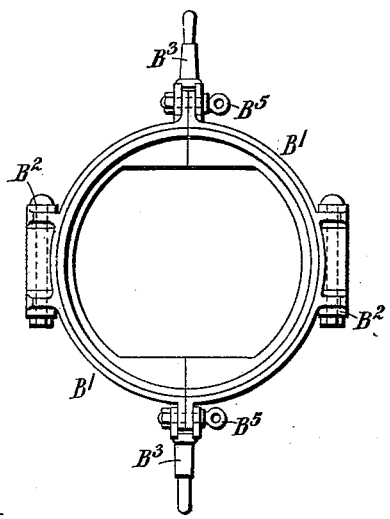
Figure 9:
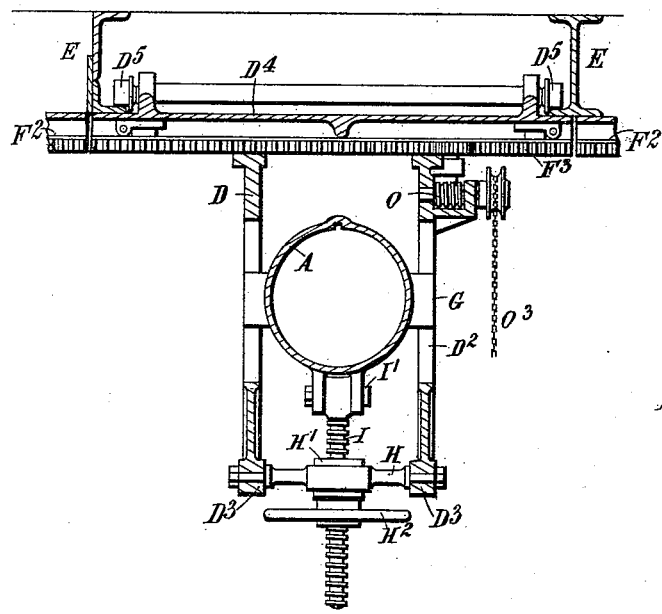
Figure 10:
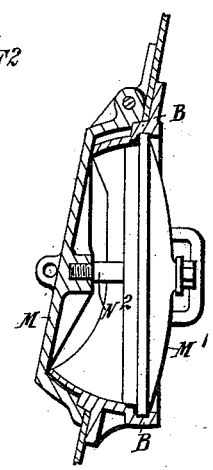
Figure 13:
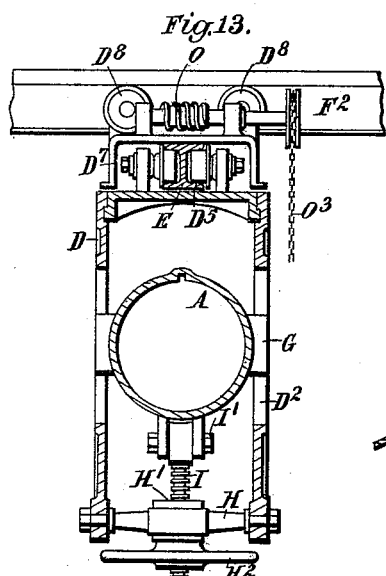
Figure 15:
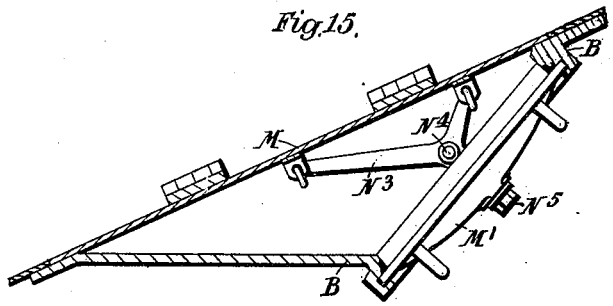

In the accompanying drawings, Figure 1 is a plan, partly in horizontal section, and Fig. 2 a side elevation, partly in vertical section, showing a torpedo-launching apparatus placed in the stern of a vessel. Fig. 3 is a transverse section on the line $z\, z$, Fig. 2, drawn to an enlarged scale. Fig. 4 is a portion of Fig. 1, drawn to an enlarged scale, the parts being shown in a different position. Fig. 5 is a front elevation, and Fig. 6 a side elevation, partly in vertical section, illustrating a modification of my invention hereinafter described. Fig. 7 is a plan, partly in horizontal section, and Fig. 8 a side elevation, partly in vertical section, showing another modification of my said invention. Fig. 9 is a transverse section on the line $z'\, z'$, Fig. 8, drawn to an enlarged scale. Fig. 10 is a plan, partly in horizontal section, also drawn to an enlarged scale, showing the means for closing the port-hole of the apparatus shown in Figs. 7 to 9. Fig. 11 is a plan, partly in horizontal section, and Fig. 12 a side elevation, partly in vertical section, illustrating a further modification of my said invention. Fig. 13 is a transverse section on the line $z^2\, z^2$, Fig. 12, drawn to an enlarged scale. Fig. 14 is a side elevation, partly in vertical section, showing a detail of construction; and Fig. 15 is a plan, partly in horizontal section, showing the means for closing the port-hole of the apparatus shown in Fig. 11.

A is a torpedo-tube provided with a spherical swelling or enlargement A', which, in combination with two socket-pieces B B', forms a ball-and-socket or universal joint, about which the said tube can be turned for the purpose of aiming or pointing the same. The socket-piece B is arranged to form the interior frame of the port-hole, and the other socket-piece B' is adapted to be readily connected with or disconnected from the said piece B. A leather washer is placed between the two pieces B B' to insure tightness of the joint and prevent the passage of water through the port-hole while the torpedo-tube is in place therein. A spring-catch C in the socket-piece B' is adapted to enter a suitable hole formed in the spherical swelling A' to maintain the socket-piece B' in the proper position upon the said swelling A' when the said piece B is unscrewed or released from the socket-piece B'. By means of this special articulation or ball-and-socket joint the tube A, when in position in the same, is permitted to move freely in all directions around a fixed point in the port-hole. I thus provide for the use of torpedo-tubes in port-holes having a minimum area of opening. The torpedo-tube can, moreover, when run out, be secured in the port-hole very rapidly, and can be detached instantaneously when it is deemed advisable to withdraw it into the ship, so that it may occupy the position indicated by the dotted lines.

For supporting the rear extremity of the tube, while permitting the free movement thereof for pointing or aiming, I employ a device whereby the tube is suspended from the beams of the upper deck, thus avoiding the encumbrance which is occasioned in a covered battery by the tube when mounted upon an ordinary carriage resting upon the deck of the battery.

D, Figs. 1, 2, and 3, is a carriage provided with mechanism for effecting the vertical pointing and supported by means of rollers D' upon a chassis E. The said chassis E is supported at its forward end by a truck F, provided with wheels F', adapted to run upon a racer or roller path $F^2$, firmly attached to one of the deck-beams and concentric with the spherical swelling A', thus allowing the said truck and the carriage D and tube A to be moved horizontally about the aforesaid ball-and-socket joint. The said chassis is, moreover, further supported, as hereinafter described. The carriage D is formed of two parallel cheeks having segmental grooves $D^2$ concentric with the spherical swelling A', which grooves form guides for correspondingly-shaped pieces G, fixed upon the launching-tube A. The said cheeks are provided at their lower extremities with bearings $D^3$, which support a cross-piece or horizontal shaft H, as more clearly shown in Fig. 3. In the center of this cross-piece or horizontal shaft H is provided a nut H', which can be turned by a hand-wheel $H^2$. I is a screw-shaft which works in the said nut H' and the head of which is jointed at I' to the lower part of the tube A. For effecting the vertical pointing of the tube all that is necessary is to operate the hand-wheel $H^2$ in the proper direction, and thus turn the said tube about the universal joint, the pieces G in this movement sliding up or down in the guide-grooves $D^2$.

The chassis E is constructed of two parallel girders connected by cross-pieces E' $E^2$. The said girders are preferably formed of channeled irons, in which run the wheels or rollers D' for supporting the carriage D. The cross-piece E' of the said chassis is supported by a forked piece j, pivoted to the said cross-piece E' and provided with rollers j', by means of which it rests upon the lower flange of one of the deck-beams. To the forked piece j is attached an endless chain K, which is passed around wheels or pulleys K', Fig. 1. One of the wheels or pulleys K' is provided with a worm-wheel geared with a worm $K^2$, which can be operated by means of a crank or hand wheel $K^3$ or by means of a hanging chain or other suitable device for the purpose of effecting the horizontal pointing or training of the tube.

The launching-tube A is arranged to turn or swing both in the vertical and in the horizontal pointing about the aforesaid spherical bearing or ball-and-socket joint, the rollers F' running during the horizontal movement upon their circular path $F^2$, while the forked piece j travels along the aforesaid deck-beam, which is straight. In this movement the girders of the chassis E slide in the cross-piece E', and thus allow the said forked piece j to travel along its rectilinear roller-path. Moreover, with this arrangement the launching-tube A can be easily withdrawn into the position shown in dotted lines. For this purpose the said tube is, if necessary, adjusted by operating the vertical pointing device, so as to allow the said tube to be secured to the carriage D by means of a suitable bolt or pin. The collar or movable portion B' of the universal joint is then disengaged from the socket-piece B, and the tube A and carriage D are moved backward upon the chassis E. By turning the said chassis E upon its roller-paths this movable part of the apparatus, comprising the said chassis, the tube, and the carriage, can then be shifted laterally into a position in which it will least encumber the deck. The running out is effected with the same facility and rapidity by reversing the movements of the said apparatus.

Figure 6:
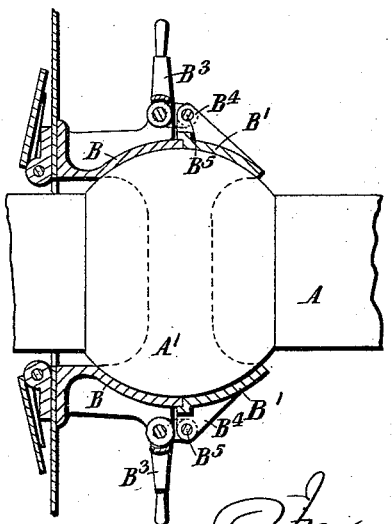

In some instances I connect the tube with the side or wall of the ship or battery as follows, viz: I employ a collar or socket-piece B', formed in two parts, as shown in Figs. 5 and 6, which parts are connected by hinge-joints $B^2$ to the socket-piece B, attached to the side of the ship. When the two parts B' are closed upon the spherical enlargement A', which they fit accurately, they are secured in position by means of hand-levers $B^3$, the forked ends of which engage with lugs $B^4$, formed upon the parts B'. Eyebolts $B^5$ are passed through the forked ends of the levers $B^3$ and through the lugs $B^4$, for the purpose of preventing the separation of the half-collars B' during the discharge. In this case, to unship the tube A it is only necessary to remove the eyebolts $B^5$ and move the levers $B^3$ toward the side of the ship, and then to turn the parts B' about their hinges away from the ball or spherical enlargement A'. The tube A is thus released, and may then be withdrawn from the port-hole.

To permit the rapid opening and closing of the port-hole and at the same time insure a perfectly-tight joint, I find it advantageous to employ the device shown in Fig. 4, which device comprises inner and outer doors M M'. The outer door M is made in two parts, which are connected by hinge-joints to the side of the ship. The inner door M' is provided with segmental inclined projections or interrupted screw-threads, and is designed to be connected in place of the collar or socket-piece B' with the socket-piece B. Washers of leather or other suitable material are placed in grooves around the doors. The outer and inner doors M M' are joined by a cross-piece N and bolt N', so that considerable pressure can be applied to the said leather or other washers.

When the launching-tube is to be placed athwart ships between decks, I modify my apparatus, as shown in Figs. 7, 8, and 9. In this modification to permit the rapid running out and in of the tube A a gap is formed in that portion of the roller-path $F^2$ which is situated between the two beams or slides E, (which may be two of the deck-beams of the ship,) and a roller-path that fills up the said gap is carried by a truck $D^4$, provided with wheels or rollers $D^5$, adapted to roll along the said beams or slides, which are utilized directly as roller-paths. The movement or adjustment of the carriage D upon the roller-path $F^2$ for horizontal pointing is effected through the medium of a worm O, worm-wheel O', and pinion $O^2$ by means of a hanging chain $O^3$. This gearing is mounted on the carriage D, and the pinion $O^2$ is geared with a toothed rack $F^3$, provided upon one side of the interior of the roller-path $F^2$. The tube A may be connected at its head by means of a hook to a cross-piece $E^2$, having at its extremities rollers $E^3$, arranged to travel along the said beams E. The tube, being thus sustained near its spherical or ball-and-socket joint and being supported at or near its rear extremity by the truck $D^4$ and rollers $D^5$, can, when disengaged from the said spherical or ball-and-socket joint, readily be withdrawn completely from the port-hole into the ship and then raised and made fast between the beams, as indicated by the dotted lines in Fig. 8. The running out of the said tube can, moreover, be rapidly effected by reversing the operations.

The device for closing the port-hole (shown more clearly in Fig. 10) is based upon the same principle as that hereinbefore described, the main differences consisting in the construction of the outer door M in one piece and the securing of this door to the inner door M' by a simple bolt $N^2$.

In the modification of my said invention (illustrated in Figs. 11 to 13) the tube A when run out is supported at its rear end through the medium of its carriage D upon the chassis or slide E, which is I-shaped in transverse section, and the forward end of which rests upon and is pivoted or jointed at $E^4$ to the socket-piece B, the pivot being in a vertical line extending through the center of the spherical or ball-and-socket joint. The said chassis E is, moreover, supported by a truck $D^7$, provided with rollers $D^8$, movable upon the roller-path $F^2$, which has a toothed rack $F^3$, as and for the purpose above specified.

The horizontal pointing or training is effected by actuating the worm O, worm-wheel O', and pinion $O^2$ by means of the hanging chain $O^3$, the said pinion $O^2$, which is geared with the rack $F^3$, causing the truck $D^7$, with the rollers $D^8$, to run upon the roller-path $F^2$.

To permit the ready withdrawal of the launching-tube A from the port-hole into the interior of the ship, the said tube is attached near the spherical swelling or enlargement A' to a truck $F^4$, which has rollers $F^5$ arranged to run upon the chassis E. Therefore the said tube when disengaged from the spherical or ball-and-socket joint will be supported in two places by rollers. It can then be easily withdrawn or moved backward along the chassis E and caused to pass on to an I-shaped girder $E^5$, arranged so as to form a prolongation of the said chassis. The said girder $E^5$ is supported at or near its extremities by trucks $E^6$, provided with rollers $E^7$, running upon deck-beams. One of the said trucks $E^6$ is also provided with rollers $E^8$, Fig. 14, upon which the I-shaped girder $E^5$ is supported. The tube A can therefore be moved aside, either to permit the introduction therein under cover of a fresh torpedo or to permit the making fast of the said tube to the side of the ship, as indicated by dotted lines in Fig. 11. The running out of the tube can be effected with the same facility and rapidity by reversing the above-described operations.

The device for closing the port-hole (shown more clearly in Fig. 15) is so constructed that it will present a form corresponding with the form of the forward part of the ship. The outer and inner doors M M' are united by a forked cross-piece $N^3$, pivoted or jointed at $N^4$ to the head of a bolt $N^5$, thus permitting the fastening of the said doors M M', as shown in Fig. 15.

What I claim is—

1. In a torpedo-tube mounting, the combination, with a torpedo-tube connected by a universal joint with the side or wall of a ship or battery, of a carriage for the said tube, provided with an elevating-screw and supported by rollers arranged to run upon a chassis, beam, or slide, and a truck for suspending the said chassis or slide from an overhead roller-path, so as to permit its movement about the vertical axis of the said universal joint, for the purposes above specified.

2. In a torpedo-tube mounting, the combination, with the torpedo-tube, of a carriage therefor supported by rollers arranged to run upon a chassis or slide, an overhead roller-path, and a truck for suspending the said chassis or slide from the said roller-path, substantially as and for the purposes set forth.

3. In a torpedo-tube mounting, the combination, with the torpedo-tube A and the carriage D, provided with the rollers D', of the chassis or slide E, the truck F, provided with rollers F' and supported on a segmental roller-path $F^2$, attached to overhead beams, the cross-piece E', and the truck $j$ for the chassis or slide E, provided with the rollers $j'$, arranged to run upon an overhead beam, substantially as and for the purposes set forth.

4. In a torpedo-tube mounting, the combination, with the torpedo-tube and the ball-and-socket joint for connecting the same with the side or wall of a ship or battery, of a carriage D, provided with rollers, whereby it is supported on a segmental roller-path concentric with the said joint, and a truck $D^4$, supporting the said roller-path and provided with rollers arranged to run upon beams or girders E, substantially as and for the purposes set forth.

5. In a torpedo-tube mounting, the combination, with the chassis for supporting the tube and carriage and a truck whereby the said chassis is suspended from one of the deck-beams, of the endless chain K, the pulleys K', the worm-wheel fixed on one of the said pulleys, the worm $K^2$, and the hand-wheel $K^3$, substantially as and for the purposes set forth.

6. In a torpedo-tube mounting, the combination, with the girder or chassis E, carrying the tube A, and the truck supporting the front portion of the said chassis, of means, substantially such as above described, whereby the said chassis may be moved upon a segmental or curved path, while the truck supporting the rear extremity of the said chassis is moved upon a rectilinear path, substantially as and for the purpose set forth.

7. In a torpedo-tube mounting, the combination, with the tube A and the ball-and-socket joint for connecting the same with the side or wall of a ship or battery, of the carriage D, provided with rollers, the beam or girder E, from which the said carriage is suspended and which is arranged to turn about a vertical axis passing through the center of the ball-and-socket joint, and means, substantially such as above described, for effecting the turning of the said beam or girder, substantially as and for the purposes set forth.

8. In a torpedo-tube mounting, the combination, with the tube A, the carriage D, and the beam or girder E, of the beam or girder $E^5$, suspended from the deck-beam, so that it can be moved either into line with the said beam or girder E or into proximity to the side of the ship, substantially as and for the purposes set forth.

In testimony whereof I have hereunto signed my name in the presence of two subscribing witnesses.

JEAN BAPTISTE GUSTAVE ADOLPHE CANET.

Witnesses:
ROBT. M. HOOPER,
DENIS P. KEOGH.